United States Patent
Huber et al.

(10) Patent No.: US 8,132,756 B2
(45) Date of Patent: Mar. 13, 2012

(54) DEVICE WITH PLANE JETS FOR REDUCING THE NOISE GENERATED BY AN AIRCRAFT ENGINE

(75) Inventors: Jerome Huber, Toulouse (FR); Jean-Paul Bonnet, Poitiers (FR); Joel Delville, Poitiers (FR); Peter Jordan, Rom (FR); Francois Strekowski, Tours (FR)

(73) Assignees: Centre National de la Recherche Scientifique (CNRS), Paris (FR); Universite de Poitiers, Poitiers (FR); Airbus Operations SAS, Toulouse (FR)

( * ) Notice: Subject to any disclaimer, the term of this patent is extended or adjusted under 35 U.S.C. 154(b) by 0 days.

(21) Appl. No.: 12/415,353

(22) Filed: Mar. 31, 2009

(65) Prior Publication Data

US 2010/0065680 A1 Mar. 18, 2010

(30) Foreign Application Priority Data

Mar. 31, 2008 (FR) ...................... 08 52122

(51) Int. Cl.
*F02K 1/38* (2006.01)
*F02K 1/40* (2006.01)
(52) U.S. Cl. ........................ 244/53 R; 60/39.5; 60/262
(58) Field of Classification Search ............... 244/53 R; 60/39.5, 262
See application file for complete search history.

(56) References Cited

U.S. PATENT DOCUMENTS

| | | | | | |
|---|---|---|---|---|---|
| 2,990,905 | A | * | 7/1961 | Lilley | 181/220 |
| 3,599,749 | A | * | 8/1971 | Millman | 181/220 |
| 3,618,701 | A | * | 11/1971 | Macdonald | 181/221 |
| 4,254,620 | A | * | 3/1981 | Wright et al. | 60/263 |
| 5,428,954 | A | * | 7/1995 | Cowan, Sr. | 60/262 |
| 5,947,412 | A | * | 9/1999 | Berman | 244/1 N |
| 6,571,549 | B1 | * | 6/2003 | Stanek | 60/262 |
| 6,786,038 | B2 | * | 9/2004 | Lair | 60/226.1 |
| 6,826,901 | B2 | * | 12/2004 | Hebert | 60/204 |
| 7,159,383 | B2 | * | 1/2007 | Barton et al. | 60/226.1 |
| 7,246,481 | B2 | * | 7/2007 | Gutmark et al. | 60/204 |
| 7,412,832 | B2 | * | 8/2008 | Gutmark et al. | 60/770 |
| 7,581,692 | B2 | * | 9/2009 | Graziosi et al. | 244/1 N |
| 7,870,722 | B2 | * | 1/2011 | Birch et al. | 60/226.1 |
| 2004/0237501 | A1 | * | 12/2004 | Brice et al. | 60/204 |

(Continued)

FOREIGN PATENT DOCUMENTS

EP 1 580 418 A2 9/2005

(Continued)

OTHER PUBLICATIONS

U.S. Appl. No. 12/935,450, filed Sep. 29, 2010, Huber, et al.

(Continued)

*Primary Examiner* — Bret Hayes
*Assistant Examiner* — Joshua Freeman
(74) *Attorney, Agent, or Firm* — Oblon, Spivak, McClelland, Maier & Neustadt, L.L.P.

(57) ABSTRACT

An aircraft engine having a longitudinal axis, including a wall surrounding a gas stream that is ejected at a downstream end of the wall along the longitudinal axis, wherein a plurality of conduits distributed at the periphery of the downstream end of the wall are each capable of ejecting, via an outlet orifice, a fluid jet in the form of a sheet, in such a way that the jets thus ejected each form a fluid perturbation around the ejected gas stream.

13 Claims, 7 Drawing Sheets

U.S. PATENT DOCUMENTS

| | | | |
|---|---|---|---|
| 2005/0214107 A1* | 9/2005 | Gutmark et al. | 415/1 |
| 2008/0078159 A1 | 4/2008 | Thomas et al. | |
| 2008/0134665 A1* | 6/2008 | Birch et al. | 60/226.3 |
| 2009/0320487 A1* | 12/2009 | Alkislar et al. | 60/771 |

FOREIGN PATENT DOCUMENTS

| | | |
|---|---|---|
| EP | 1 936 172 A2 | 6/2008 |
| FR | 1 157 063 | 5/1958 |
| FR | 1 195 859 | 11/1959 |
| WO | WO 02/29232 A1 | 4/2002 |
| WO | WO 2008/100712 A2 | 8/2008 |

OTHER PUBLICATIONS

U.S. Appl. No. 12/935,423, filed Sep. 29, 2010, Huber, et al.
U.S. Appl. No. 12/935,445, filed Sep. 29, 2010, Huber, et al.

* cited by examiner

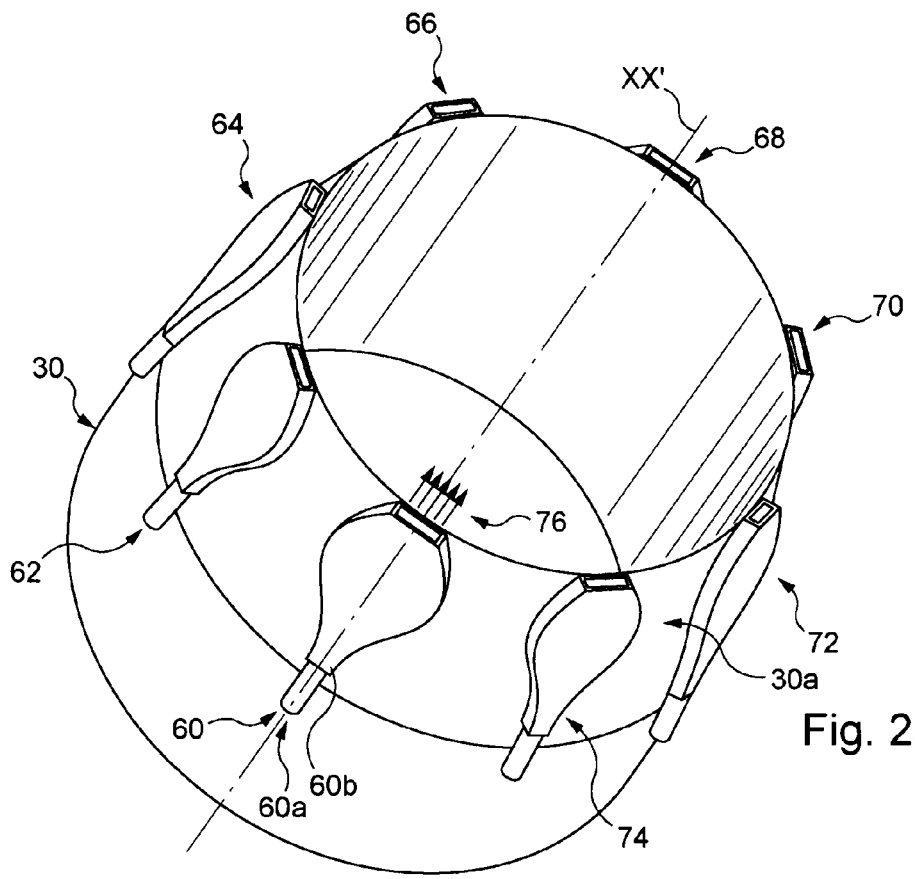
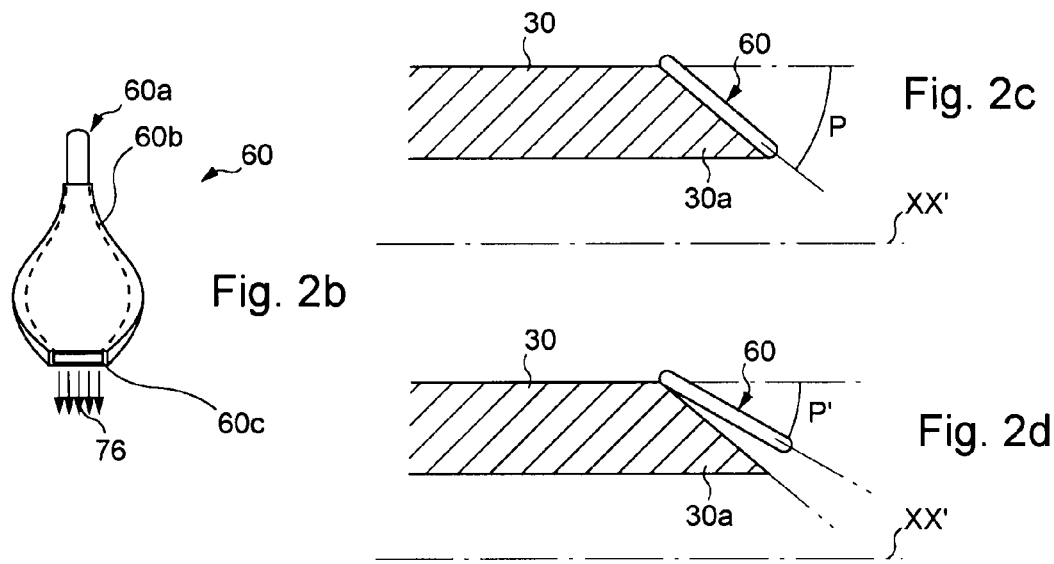
Fig. 2a
Fig. 2b
Fig. 2c
Fig. 2d

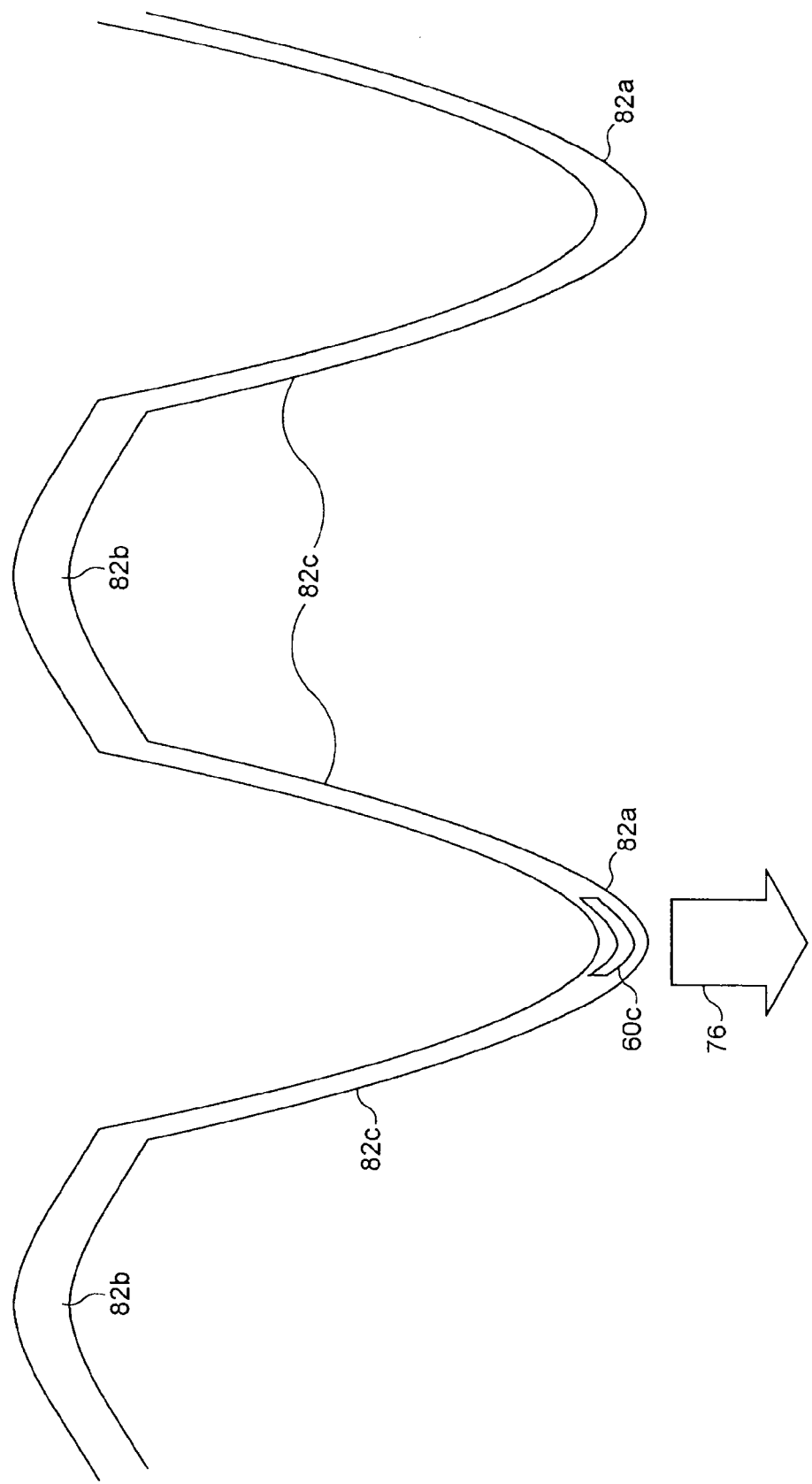

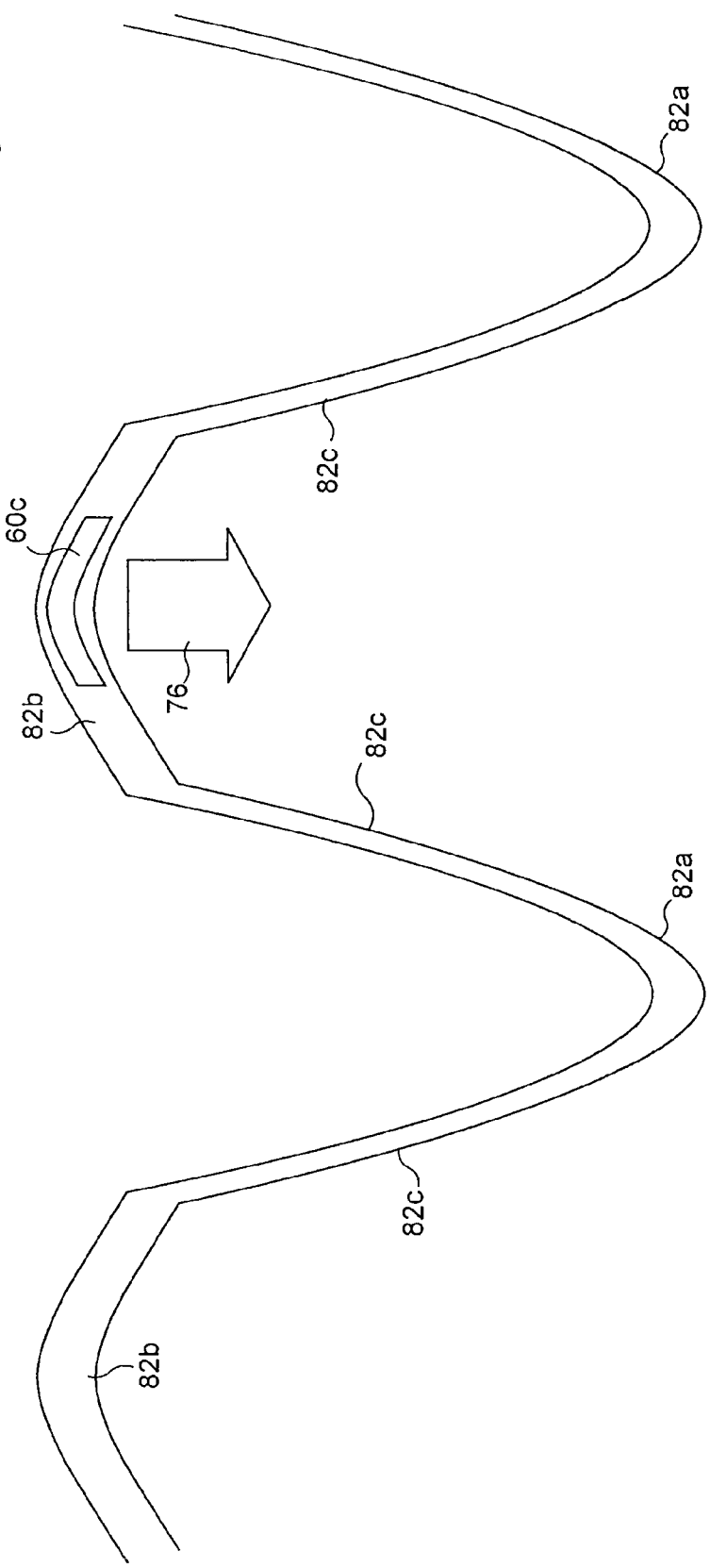

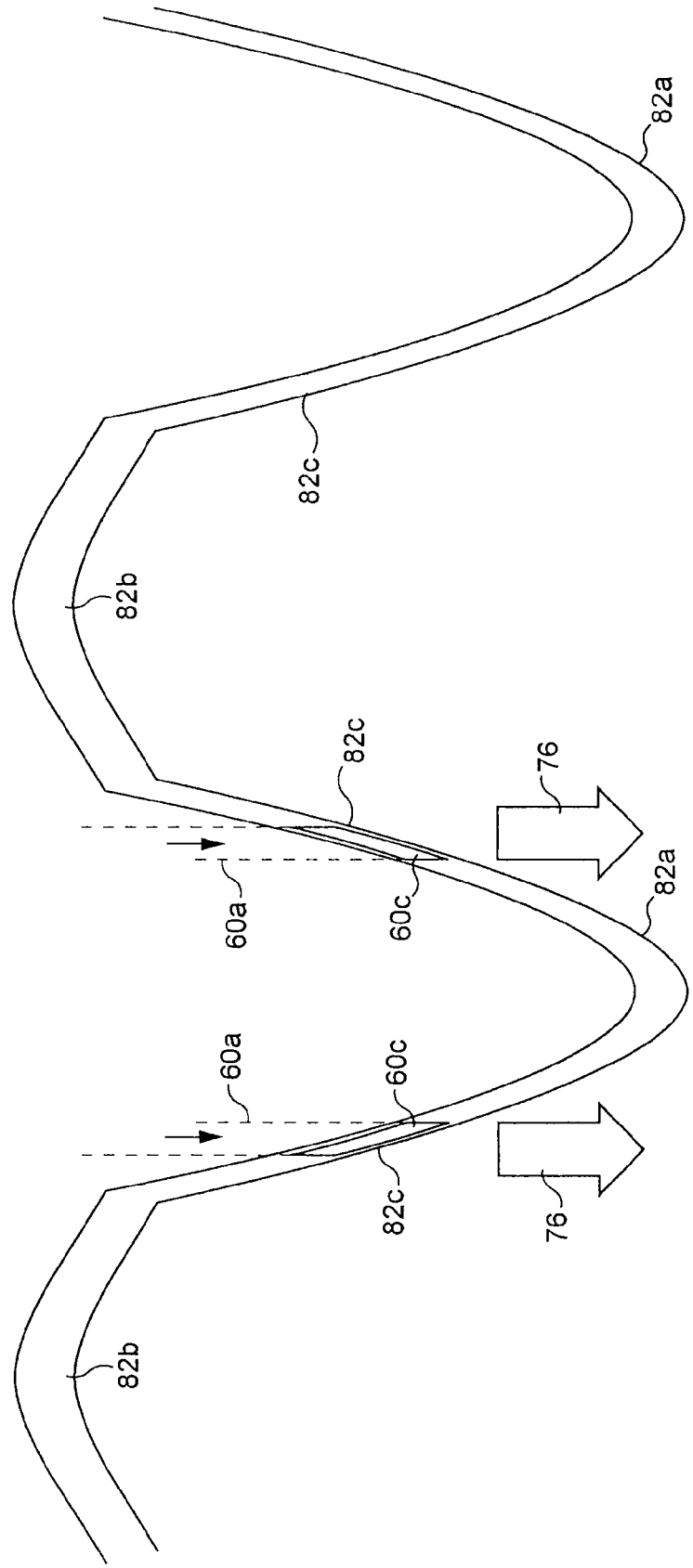

DEVICE WITH PLANE JETS FOR REDUCING THE NOISE GENERATED BY AN AIRCRAFT ENGINE

The invention relates to an aircraft engine.

As is known, an aircraft engine has the form of a nacelle, at the center of which there is positioned a turbojet.

This nacelle is intended to be mounted under the main wing of an aircraft by means of an engine pylon.

The turbojet is composed of a gas generator which drives a fan mounted on the shaft of the gas generator, upstream therefrom in the longitudinal direction of the engine nacelle.

Part of the air stream passing longitudinally through the nacelle penetrates into the gas generator and participates in combustion.

This stream is known as the primary stream and is ejected at the generator outlet.

The part of the air stream entering the nacelle and that does not pass through the gas generator is driven by the fan.

This stream, known as the secondary stream, flows in an annular passage in a manner concentric with the primary stream. This passage is formed between an external longitudinal wall (nacelle wall) and an internal longitudinal wall surrounding the gas generator.

The secondary stream is ejected from the nacelle at the downstream end of the external wall thereof in substantially longitudinal direction of the engine.

The internal wall surrounding the gas generator also defines, together with an internal longitudinal member, an annular passage through which there flows the primary stream.

This stream is ejected at the downstream end of the internal wall surrounding the gas generator.

During takeoff phases, the ejected gas stream (primary and secondary stream) assumes very high velocities. At these velocities, the encounters between the ejected air and the surrounding air and between the primary stream and the secondary stream generate considerable noise.

There therefore exists a need to reduce the noise caused by the ejection of the gas stream or streams at the outlet of the engine nacelle of an aircraft.

For this purpose, the object of the invention is an aircraft engine having a longitudinal axis, comprising a wall surrounding a gas stream that is ejected at a downstream end of the wall along the longitudinal axis, characterized in that a plurality of conduits distributed over the periphery of the downstream end of the wall are each capable of ejecting, via an outlet orifice, a fluid jet in the form of a sheet, in such a way that the jets thus ejected each form a fluid perturbation around the ejected gas stream.

By generating a plurality of fluid sheets distributed at the external periphery of the ejected gas stream (air or combustion gas), the interaction between this gas stream and the air stream, or more generally the gas stream flowing at the external periphery of the fluid sheets, therefore is reduced. This fluid barrier reducing the interaction is formed over a given longitudinal distance, starting from the downstream end of the wall.

By this fact, the external stream is less easily entrained by the high-speed ejection of the gas stream than heretofore, and the noise generated by the encounter between these streams is therefore reduced.

When the fluid sheets create screens sufficiently close to one another, the ejected gas stream is surrounded on all sides by a fluid curtain.

This curtain forms a kind of acoustically insulating sheath, preventing the flow interactions that cause the noise.

This acoustically insulating sheath also has the effect of generating longitudinal vortices, which develop on the lateral edges of each fluid sheet, at the lateral extremities of the corresponding outlet orifice.

These vortices profoundly modify the nature of the turbulence and the modes of interaction between the ejected fluid and the ejected gas stream.

The fluid curtain formed by multiple separate jets additionally makes it possible to limit the fluid flowrate compared with a single jet that would emerge from an annular orifice completely surrounding the downstream wall end.

It will be noted that the invention makes it possible to obtain, in simple manner, with one single jet per conduit, a fluid cone or triangle at the orifice outlet, in a manner analogous to the fluid triangle produced by the confluence of two co-current jets, as described in the application WO 2002/013243.

In general, an aircraft engine is equipped with two concentric walls and two respective downstream ends (trailing edges), where a primary stream and a secondary stream are ejected.

The aforesaid conduits may then constitute equipment of one and/or the other of these two downstream ends.

It will be noted that the conduits may be disposed on the outside or the inside of the downstream end of the wall in relation to the radial position of this wall with respect to the longitudinal axis of the engine. The conduits may also be integrated in the thickness of this wall, thus limiting the losses of aerodynamic performance.

More particularly, the outlet orifice of each conduit possesses an outlet cross section that is broader than it is high, in such a way that the fluid sheet extends perpendicular to the height, the height being considered in radial direction relative to the longitudinal axis.

The outlet orifice (slit) has a cross section of substantially rectangular shape. The shape may vary somewhat beginning from the moment when it is elongated transversely: for example, it may be oblong, oval, etc.

The fluid sheets shaped in this way each form a substantially plane fluid jet.

According to one characteristic, the downstream end of the wall is provided with a plurality of chevrons distributed at the periphery thereof in order to form an acoustically attenuating mechanical device.

The chevrons interact with the gas stream emerging from the downstream end where they are disposed, thus causing vortices that propagate along the stream (in the longitudinal direction of the engine) and contribute to reducing the noise.

When the fluid-ejection conduits are disposed in relation to the downstream end of the wall, the chevrons may be arranged at this same end to reinforce the effect of attenuation of the noise generated by the engine.

As a variant, the chevrons may be arranged at another downstream wall end surrounding the outlet of another stream ejected from the engine.

According to another variant, the fluid-ejection conduits and the chevrons may be integrated at the same downstream wall end, while another downstream wall end surrounding the outlet of another stream ejected from the engine may also be equipped with chevrons alone or with conduits alone or else with chevrons in cooperation with conduits.

According to one characteristic, the conduits are associated with the chevrons which give the downstream end of the wall a serrated shape comprising a succession of tips and roots.

The fluid sheet emerging from each conduit is associated with the longitudinal vortex generated at the associated chevron, amplifies the effects thereof and thus reinforces its anti-noise action.

It will be noted that, by ejecting the sheet in the same direction as that in which the vortex extends, the rotation thereof is increased.

According to one characteristic, outlet orifices of the conduits are disposed at the tips of the chevrons.

This arrangement makes it possible to prolong the penetration of the chevrons in fluid manner and thus to increase their natural effectiveness.

In other words, for equal effectiveness, this arrangement makes it possible to reduce the physical space requirement without increasing the loss of thrust during cruising flight.

According to one characteristic, outlet orifices of the conduits are disposed in the roots of the chevrons.

The shape of the outlet orifice, which is adapted to produce a jet in the form of a fluid sheet, makes it possible to reinforce the vortex-like activity associated with the chevrons, inasmuch as they themselves also create longitudinal vortices.

According to one variant, outlet orifices of conduits are disposed at both the tips and roots of the chevrons.

According to one characteristic, outlet orifices of the conduits are disposed in the inclined portions of the chevrons that each connect a tip to an adjacent root.

These orifices are oriented in such a way that they each produce a jet substantially parallel to the extension of the downstream wall end, in a longitudinal direction of the corresponding chevron, on both sides of the tip thereof.

Thus oriented, the orifices eject fluid sheets that bracket each chevron in pairs and make it possible to improve the formation of vortices around each chevron.

According to one characteristic, outlet orifices of the conduits are shaped so as to eject fluid jets inclined toward the longitudinal axis XX' at a penetration angle.

According to one characteristic, outlet orifices of conduits are shaped so as to eject fluid jets, forming what is known as a sliding angle with the longitudinal axis in a view projected onto a plane perpendicular to a transverse plane.

Another object of the invention is an aircraft comprising one or more aircraft engines according to the description presented in the foregoing.

Other characteristics and advantages will become apparent from the description hereinafter, provided solely by way of non-limitative example and written with reference to the attached drawings, wherein:

FIG. 2a is a schematic view in perspective of a downstream nacelle-wall end equipped according to a first embodiment of the invention;

FIG. 2b is an enlarged partial schematic view as an overhead view of the downstream end of FIG. 2a;

FIGS. 2c and 2d are partial schematic views showing the inclination of the conduits at a penetration angle;

Figure 2E:
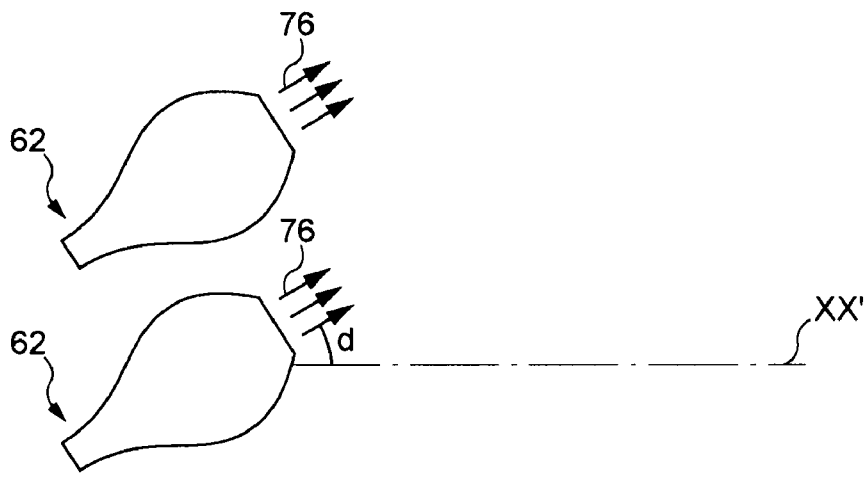
FIG. 2e illustrates a sliding angle given to the conduits according to one alternative embodiment.
Figure 2F:
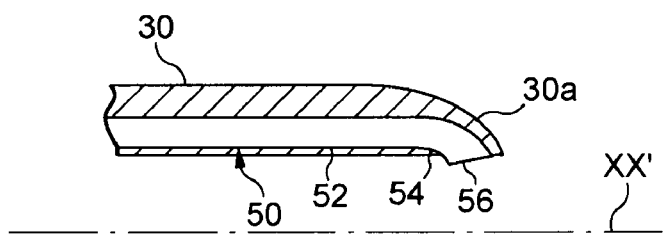

FIG. 2f schematically illustrates the installation of a conduit in the wall of the nacelle;

FIGS. 3 to 6 represent several structural forms of a second embodiment of the invention.

Figure 1A:
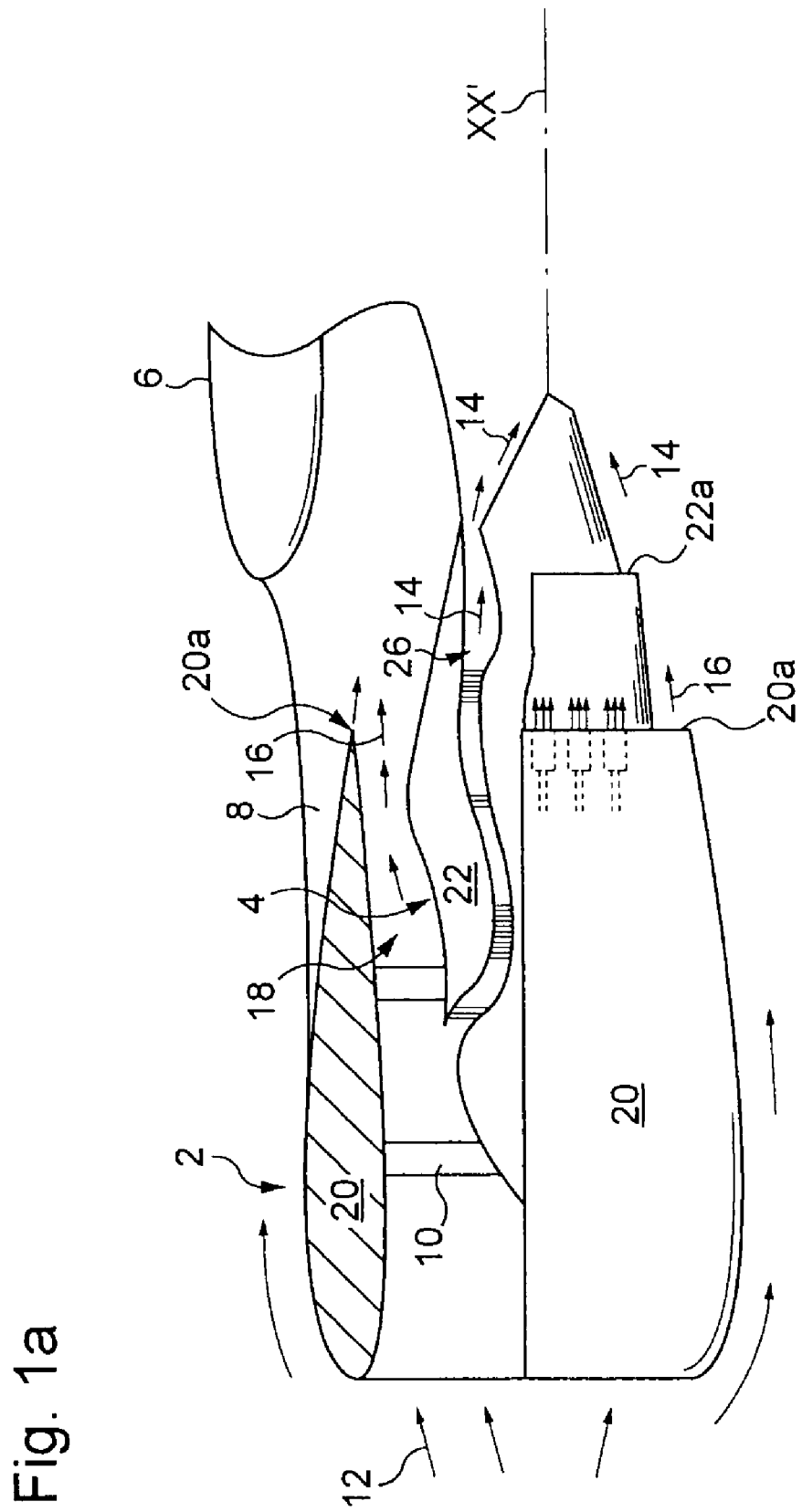
FIG. 1a is a schematic general view in longitudinal section of an aircraft engine.

As represented in FIG. 1 and denoted by general reference marked 2, an aircraft engine nacelle envelops a turbojet 4 and is mounted under a wing 6 of an aircraft in known manner by means of an engine pylon 8.

Turbojet 4 comprises a gas generator that drives a fan 10 mounted on the shaft of the generator, upstream therefrom in the longitudinal direction of the engine nacelle.

The nacelle has rotational symmetry around longitudinal axis XX'.

Air stream 12 entering the nacelle passes longitudinally therethrough, penetrates into gas generator 4 and participates in combustion.

Hot propulsive stream 14 ejected at the generator outlet is known as the primary stream.

The part of air stream 12 entering the nacelle and not passing through the gas generator is driven by fan 10.

This cold propulsive stream 16, known as the secondary stream, flows into an annular passage 18 disposed concentrically relative to the gas generator and thus relative to primary stream 14.

This passage 18 is formed between an external longitudinal wall 20 (nacelle cowling) and an internal longitudinal wall 22 (engine cowling) surrounding the gas generator.

Secondary stream 16 is ejected from the nacelle at downstream end 20a of external wall 20, substantially in the longitudinal direction of the engine.

Internal longitudinal wall 22 defining the external envelope of the gas generator defines, together with central longitudinal part 24 constituting the heart of the engine, another annular passage 26 through which primary stream 14 flows.

This stream is more particularly ejected at downstream end 22a of internal wall 22.

A fluid device for reducing the sound level of the engine according to the invention is applied to the nacelle of reactor 2 of FIG. 1.

This device is disposed, for example, in relation with the substantially cylindrical external wall 20 (external cowling) of the nacelle, and which surrounds annular passage 18 via which secondary stream 16 is ejected.

It may also be disposed in relation with internal wall 22 (internal cowling) of the nacelle, which surrounds turbojet 4 and at the end of which primary stream 14 is ejected.

It will be noted that a fluid device may be provided on one and/or on the other of the two concentric walls (external and internal cowlings).

More particularly, the fluid device according to the invention is associated with a so-called downstream end 20a and/or 22a of the wall in question, at the trailing edge thereof (also referred to as outside lip).

The fluid device according to the invention is capable of generating, on command, a perturbation of the flow immediately downstream from the downstream end of the wall and in a zone situated on the external periphery of the stream (primary or secondary) ejected via this end.

It will be noted that the fluid device according to the invention is capable of producing fluid jets in the form of fluid sheets distributed circumferentially downstream from the downstream end of the wall. This device may be attached simply to an existing engine-nacelle nozzle without involving the entire design and manufacture thereof.

The fluid sheets generated in this way interact with the layer of mixing of the stream (primary or secondary) ejected at the downstream end of the wall. The gas of the ejected stream wraps around each sheet, thus creating longitudinal vorticity that reduces the acoustic efficacy of this stream.

According to the invention (FIG. 1b), a flattened fluid jet in the form of a fluid sheet is ejected via outlet orifice or slit 21, elongated transversely by a conduit 23 disposed at the periphery of wall 30.

This jet is oriented in a direction F, which here is parallel to longitudinal axis XX'.

Longitudinally extending vortices 25 and 27 develop at edges 21a and 21b of the orifice which are situated at the two opposite ends of the orifice as viewed in its largest dimension.

These marginal vortices, which are generated when the jet emerges from orifice 21, profoundly modify the nature of the turbulence and the modes of interaction between the ejected fluid and the ejected internal gas stream.

It will be noted that the elongated character of the outlet orifice of the conduit imparts to the fluid jet a substantially conical or triangular shape, corresponding to a zone of the perturbation in which the fluid velocity is substantially constant.

This shape therefore approximates the shape of a chevron.

Figure 1B:
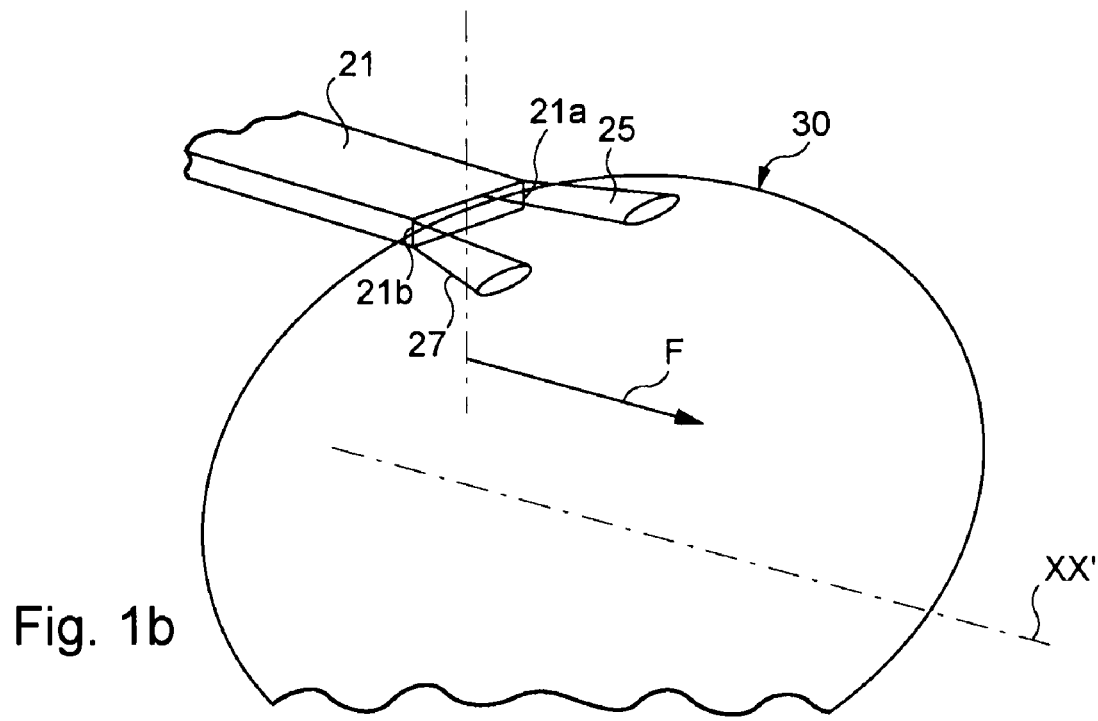
FIGS. 1b and 1c are schematic views showing respectively the formation of longitudinal vortices and of a fluid cone at the outlet of a conduit.
Figure 1C:
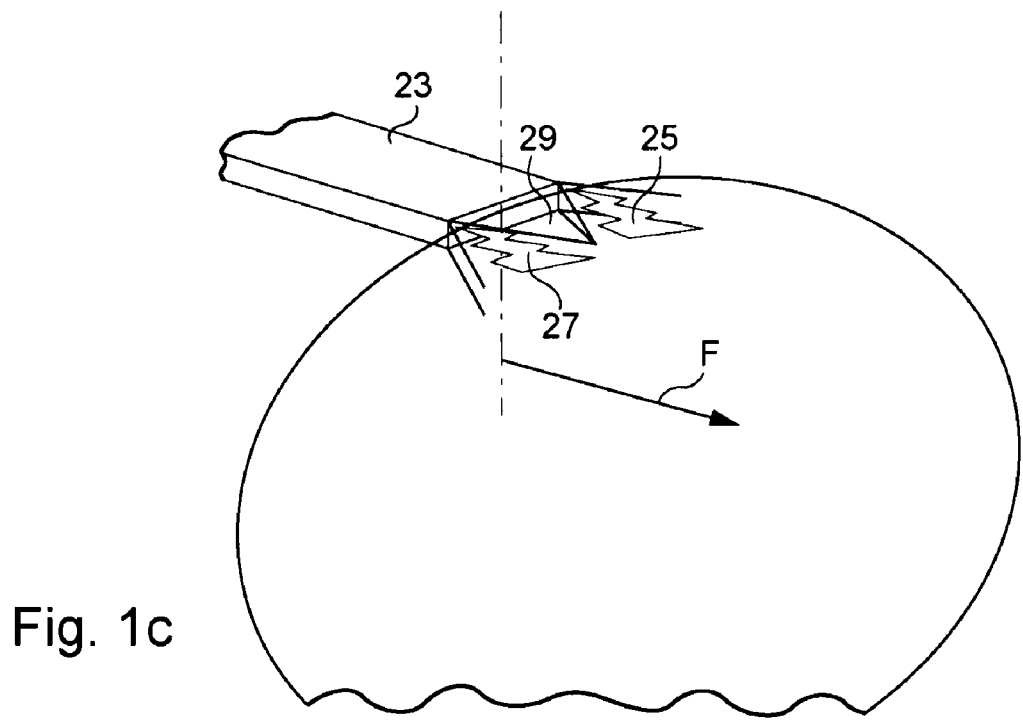

FIG. 1c illustrates very schematically the formation of the fluid cone or chevron 29 bracketed on both sides by marginal vortices 25 and 27, which give rise to mixing zones.

The perturbations generated in the form of fluid sheets also prevent the ejected stream from encountering the external stream (which is the air surrounding the nacelle when the ejected stream is the secondary stream) or in any case limit such contact. Because of this fact, the entrainment of the external stream, with lower axial velocity, in the ejected stream with higher axial velocity is prevented, or in any case limited. It follows that the production of fine turbulence responsible for the high-frequency acoustic radiation is greatly reduced.

The noise generated by the engine equipped with a device according to the invention, especially during takeoff and approach phases of the aircraft, is considerably diminished.

When the fluid sheets are situated on the engine cowling, they may also contribute to thermal mixing by modifying the mixing between the hot gases of the engine stream (primary stream) and the cold gases of the secondary stream. The fluid sheets thus contribute to reducing the noise originating from another noise source, namely the thermal gradients.

The device according to the invention may assume different structural forms, and certain structures of the device will be described hereinafter.

Each of these structures offers the advantage of effectively reducing the noise generated by an engine, which in particular has large dimensions (for example, the diameter of the external circumference of the nacelle is on the order of one to several meters).

FIG. 2a illustrates the regular disposition of a plurality of fluid devices according to a first embodiment of the invention at the periphery of downstream end 30a of wall 30 represented in FIG. 1.

Wall 30 forms a nozzle (primary or secondary), in which there flows a gas stream (primary or secondary), which is ejected at downstream end 30a of the wall.

Fluid devices 60, 62, 64, 66, 68, 70, 72 and 74 are all identical in this example, and only one of them will be described.

Device 60 comprises a conduit 60a, which is prolonged upstream as far as a compressed-air source (not shown), such as the high-pressure part of the engine. This device 60 is capable of generating, on command, a jet directed downstream toward downstream end 30a.

In its terminal part, conduit 60a is provided with a broadened shape 60b (in the manner of a forge blower), which has an outlet orifice 60c.

It nevertheless will be noted that this divergent/convergent shape is not obligatory. The shape of the terminal part of the conduit upstream from the orifice may actually be different. For example, the walls of this terminal part upstream from the orifice may be mutually parallel.

Outlet orifice 60c possesses, in cross section, a shape broader than it is high. The height is considered to be in a radial direction relative to longitudinal axis XX', and the width corresponds to a (lateral) extension along a tangent to the circular contour of downstream end 30a.

For example, outlet orifice 60c has a general rectangular shape.

The flattened shape of the outlet orifice of the central conduit makes it possible to generate, on command, a jet 76 in the form of a substantially plane fluid sheet instead of a circular jet.

Each jet interacts with the ejected stream in order to form vortices that propagate longitudinally toward downstream, thus contributing to reducing the noise generated by the ejected stream.

Furthermore, the disposition of an appropriate number of conduits at downstream end 30a makes it possible to surround and therefore isolate the internal stream of ejected gas more or less completely from the external stream, thus limiting entrainment of the external stream by ejection of the stream.

By way of example, the cross section of the outlet orifice has a height or thickness of between 0.2% and 2% of the diameter of the propulsive jet and a width or elongation of approximately 10 times the height. Thus, even if these conduits are positioned in an internal or external flow, they offer comparatively less resistance to the flow than do conduits of circular diameter with equivalent surface area.

In this way the head losses are reduced.

The radial space requirement of the conduits is also reduced, thus offering more possibilities for installing the conduits in a confined space. In this way it is easier, for example, to integrate them in the thickness of the wall.

By equipping a nozzle with the aforesaid conduits, the periphery of the downstream end of the nozzle can be covered more easily than with a plurality of conduits generating circular jets.

This is therefore particularly advantageous in the case of nozzles with large diameters, which would otherwise necessitate the installation of a large number of cylindrical conduits.

It will be noted that conduit 60a, at least in its terminal part, may be inclined toward longitudinal axis XX' at a given penetration angle, for example by following the inclination of the trailing edge of downstream end 30a (FIG. 2c).

This inclination is generally obtained by virtue of the chamfered shape of the trailing edge (outlet lip) of downstream end 30a. Conduit 60a is also disposed against the trailing edge and adopts the inclination thereof relative to the horizontal.

The angle p is generally between −90° (low penetration) and 90° (high penetration).

The choice of penetration angle makes it possible to increase, to a greater or lesser extent, the perturbation of the ejected stream by the fluid sheets which are injected more toward the longitudinal axis of the stream (FIG. 2c) or at a distance therefrom (FIG. 2d).

For example, the fluid sheets may be oriented with a penetration angle of 60° relative to the horizontal.

This orientation may be obtained by curving the free end of the conduits in such a way that their outlet orifice 60c is oriented in a manner suitable for generating a jet with the desired inclination p.

It will be noted that, to obtain a penetration angle smaller than 0°, the terminal part of the conduit may be raised or only the free end thereof may be shaped upward, for example by machining.

Furthermore, in order to modulate the effect of blowing produced by the jets on the ejected gas stream, the plane jets may not all have the same penetration angle.

The plane jets, or only some of them, may also adopt what is known as a sliding angle relative to longitudinal axis XX' of the engine, which is also the axis of the ejected stream (propulsive jet).

As represented in FIG. 2e, which is a view projected onto a plane perpendicular to a transverse plane and contains axis XX', conduits 60, 62 or only the free end thereof are oriented in a manner not aligned with axis XX'.

They form with the axis a sliding angle d, which is generally between −80° and 80° relative to axis XX', 0° corresponding to alignment on the axis.

The injection of fluid sheets 76 in sliding relationship to the longitudinal axis of the ejected stream favors the formation of the aforesaid longitudinal vorticities and thus contributes to the acoustic attenuation.

It will be noted that the sliding angle may differ from one conduit to the other or only for certain conduits. Under certain circumstances, these varied sliding angles make it possible to take into account environmental constraints (presence of elements associated with the nacelle, etc.) and preferential direction of acoustic annoyances.

It will be noted that the conduits or tubes may be integrated in the thickness of the wall (cowling) of the nacelle and may therefore adopt angles different from those of the wall.

Thus, FIG. 2f illustrates a variant in which a conduit 50 according to the invention is arranged in the interior of wall 30 along the direction of extension (longitudinal) of the wall.

This conduit comprises a rectilinear portion 52 and a conduit portion 54 forming an elbow relative to the rectilinear portion, in order to give the desired orientation (penetration angle) to outlet orifice 56 (elongated in the direction perpendicular to the plane of the figure) of the conduit.

The elbow is sufficiently short that the outlet orifice discharges level with the wall or in close proximity thereto.

The conduit portion forming the elbow may have continuous curvature and, for example, be formed by bending.

In this way the free end of conduit 23 of FIG. 1b may be curved downward in simple manner, in the direction of axis XX'.

Alternatively, the portion forming the elbow may be shaped with a straight conduit portion attached to the rectilinear portion at a connection angle.

It will be noted in addition that the installation of conduits in the wall makes it possible to avoid increasing the space requirement and to avoid impairing the aerodynamic performances.

FIGS. 3 to 6 illustrate another embodiment of the invention accompanied by several variants.

Figure 3:
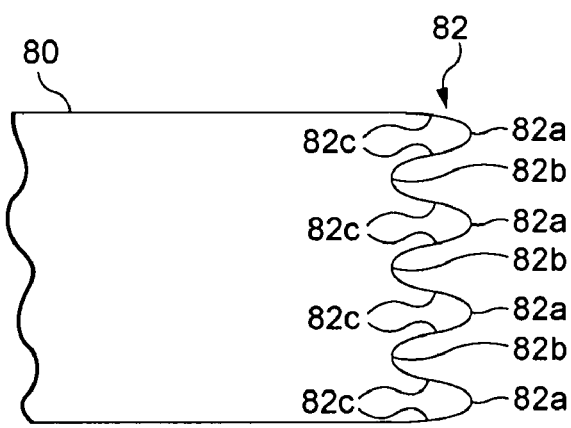

FIG. 3 represents a substantially cylindrical wall 80 of a nozzle (primary or secondary), in which there flows a gas stream (primary or secondary) which is ejected at downstream end 82 (trailing edge) of this wall.

This downstream end differs from downstream end 30a of FIGS. 2a-2f by the presence of mechanical chevrons distributed over the entire periphery of the trailing edge and which give it a crenellated or serrated shape.

In this way, downstream end 82 is configured as an alternation of tips 82a and roots 82b connected to one another by inclined portions 82c, thus constituting a succession of chevron patterns.

FIG. 4 schematically illustrates, on a larger scale, the installation of a conduit (identical to conduit 60 of FIGS. 2a-2f) in the thickness of wall 80, and particularly of trailing edge 82. More particularly, outlet orifice 60c of conduit 60 is disposed at a tip 82a, in such a way as to eject a fluid jet 76 in sheet form on command at the appropriate moment (for example, during takeoff and landing). Jet 76 is oriented in the alignment of longitudinal axis XX' of the engine according to the overhead view of FIG. 4 (zero sliding angle).

According to one variant, the conduit may assume a non-zero sliding angle.

Fluid sheet 76 is associated with the longitudinal vortex emerging from the chevron (projecting part composed of a tip 82a and of two inclined portions 82c), to amplify the effect thereof.

Furthermore, the fluid sheet reduces the entrainment of the external stream with lower axial velocity in the internal gas stream with higher axial velocity ejected via downstream end 82.

The formation of this local fluid screen therefore reduces the production of fine turbulence responsible for high-frequency acoustic radiation.

It will be noted that, for the sake of clarity, a single jet has been represented in FIG. 4, although each chevron is provided in similar manner with an ejection conduit for a jet in the form of a fluid sheet.

The combination of plane jets (sheets) and chevrons reduces the noise generated by ejection of the gas stream from nozzle 80 more effectively than with for plane jets alone or for chevrons alone.

The integration of conduits in the thickness of the wall achieves better aerodynamic performances than if the conduits were arranged in projecting manner relative to the external or internal surface of wall 80.

Nevertheless, these other arrangements are also envisioned within the scope of the invention.

FIG. 5 is a view analogous to that of FIG. 4, but which differs therefrom by the placing of outlet orifice 60c in root 82b between two chevrons.

Sheet-like jet 76 has the same orientation, and its effect is combined with the longitudinal vortices generated on both sides of each chevron.

It should be noted that the most effective contrarotating vortices produced by the chevrons are generated in the roots thereof.

It will be noted that, in the configurations of FIGS. 4 and 5, the outlet orifices are shaped in such a way as to match the end surface of the sheared face of the trailing edge (convex surface in FIG. 4 and concave surface in FIG. 5).

FIG. 6 illustrates another structural variant, in which each chevron integrates two outlet orifices, each of which discharges into one of the two inclined portions 82c that meet at tip 82a.

Part 60a of the conduit situated upstream from the orifice is oriented longitudinally (parallel to axis XX' in the plane of FIG. 6), in such a way that jet 76 generated by each outlet nozzle is oriented longitudinally, the jets thus being ejected in parallel on both sides of tip 82a.

The transverse distance between the jets and therefore between the orifices must not be too large, in order to ensure that the jets can be effectively associated with the longitudinal vortex emerging from the chevron.

Thus the orifices are disposed more closely to the tip than to adjacent roots 82b.

It will be noted that the two outlet orifices may originate from the same conduit rather than from two separate conduits as represented in FIG. 6.

It will be noted that the conduit outlet orifices of FIGS. 4 to 6 may be oriented relative to longitudinal axis XX' of the engine at a given penetration angle, as explained with reference to FIGS. 2c-2f.

All the characteristics, advantages and functioning conditions explained with reference to the embodiment of FIGS. 2a to 2f are applicable to the embodiment of FIGS. 3 to 6.

Furthermore, it should be pointed out that the velocity of the compressed air circulating in the conduits is substantially identical to the velocity of the stream ejected via the nozzle (propulsive jet).

It will be noted that a supersonic compressed-air jet may be used in certain applications.

The mass ratio between the flowrate of the air jets ejected via the conduits and that of the ejected stream ranges between approximately 0.3% and 2%.

In order to reduce the noise associated with the propulsive jets of the engines at the time of the takeoff phase or of the approach phase of the airplane, compressed air is blown through the air-supply conduits as far as the tubes distributed around the outlet circumference of the said nozzle. The circumference in question may be either that (internal circumference) separating the hot stream (primary stream) and the cold stream (secondary stream) or that separating the cold stream (secondary stream) and the ambient air (nacelle circumference). By virtue of the positioning and distribution of the conduits at the outlet circumference, the compressed-air jets are propelled out of the conduits in the form of sheets or plane jets at the convergence and penetration angles, then perturbing the propulsive jet in the flow direction.

The air jets constitute controlled jets. Connected to the high-pressure part of the engine, their supply is activated only during the phases in which control is necessary (generally during takeoff and landing phases). Outside these phases, the fluid device or devices according to the invention is or are rendered inactive simply by cutting off the supply of compressed air. The aircraft equipped in this way does not sustain any impairment in terms of drag or loss of thrust.

It will be noted that the jets may be activated independently of one another, thus offering a particularly flexible system for perturbing the ejected stream. In this way partial activation of the said jets may be envisioned: for example, actuation of jets positioned above, below, on the right or on the left of the said nozzle of FIG. 2a, thus modifying the directivity of the acoustic emissions.

According to another variant, the control jets may be produced in pulsed manner instead of with a continuous flowrate, in order to reduce the flowrates of the control jets or to improve the control performances.

Furthermore, the fluid injected in continuous or pulsed manner may be cold or hot.

The invention claimed is:

1. An aircraft engine having a longitudinal axis, the aircraft engine comprising:
a wall surrounding a gas stream that is ejected at a downstream end of the wall along the longitudinal axis, wherein a plurality of conduits distributed at the periphery of the downstream end of the wall are each capable of ejecting, via an outlet orifice, a fluid jet in the form of a sheet, in such a way that the jets thus ejected each form a fluid perturbation around the ejected gas stream, and the outlet orifice is broader than an inlet orifice of the conduit.

2. The engine according to claim 1, wherein the outlet orifice of each conduit possesses an outlet cross section that is broader than it is high, in such a way that a fluid sheet extends perpendicular to the height, the height being considered in radial direction relative to the longitudinal axis.

3. The engine according to claim 1, wherein the downstream end of the wall is provided with a plurality of chevrons distributed at the periphery of the wall in order to form an acoustically attenuating mechanical device.

4. The engine according to claim 3, wherein the conduits are associated with the chevrons, which give the downstream end of the wall a serrated shape including a succession of tips and roots.

5. The engine according to claim 4, wherein outlet orifices of the conduits are disposed at the tips of the chevrons.

6. The engine according to claim 4, wherein outlet orifices of the conduits are disposed in the roots of the chevrons.

7. The engine according to claim 4, wherein outlet orifices of the conduits are disposed in inclined portions of the chevrons each connecting a tip to an adjacent root.

8. The engine according to claim 1, wherein outlet orifices of the conduits are shaped so as to eject fluid jets inclined toward the longitudinal axis at a penetration angle.

9. The engine according to claim 1, wherein outlet orifices of the conduits are shaped so as to eject fluid jets forming what is known as a sliding angle with the longitudinal axis in a view projected onto a plane perpendicular to a transverse plane.

10. An aircraft, including at least one aircraft engine according to claim 1.

11. The engine according to claim 1, wherein the conduit is shaped like a forge blower.

12. The engine according to claim 1, wherein a cross-section of the outlet orifice has a height between 0.2% and 2% of a diameter of the engine.

13. The engine according to claim 12, wherein a width of the outlet orifice is approximately 10 times the height of the outlet orifice.

* * * * *